(12) United States Patent
Phillips et al.

(10) Patent No.: US 11,436,669 B2
(45) Date of Patent: Sep. 6, 2022

(54) TECHNIQUES FOR ONBOARDING AND VERIFICATION OF USERS TO A SERVICES PLATFORM

(71) Applicant: Capital One Services, LLC, McLean, VA (US)

(72) Inventors: Jeremy Phillips, Brooklyn, NY (US); Elizabeth Epstein, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 7 days.

(21) Appl. No.: 16/872,630

(22) Filed: May 12, 2020

(65) Prior Publication Data

US 2021/0358026 A1 Nov. 18, 2021

(51) Int. Cl.
*G06Q 40/02* (2012.01)
*G06Q 20/40* (2012.01)
*G06Q 20/04* (2012.01)
*G06Q 20/10* (2012.01)

(52) U.S. Cl.
CPC .............. *G06Q 40/02* (2013.01); *G06Q 20/04* (2013.01); *G06Q 20/10* (2013.01); *G06Q 20/401* (2013.01)

(58) Field of Classification Search
CPC ........ G06Q 40/02; G06Q 20/04; G06Q 20/10; G06Q 20/401
USPC .......................................................... 705/35
See application file for complete search history.

(56) References Cited

U.S. PATENT DOCUMENTS

| | | | |
|---|---|---|---|
| 2003/0225692 A1 | 12/2003 | Bosch et al. | |
| 2010/0042542 A1 | 2/2010 | Rose et al. | |
| 2011/0010203 A1 | 1/2011 | Wottowa et al. | |
| 2011/0208603 A1 | 8/2011 | Benefield et al. | |
| 2012/0179608 A1* | 7/2012 | Johns | G06Q 20/108 705/42 |
| 2013/0211983 A1* | 8/2013 | Lee | G06Q 40/02 705/35 |
| 2015/0332252 A1 | 11/2015 | Shahrokhi et al. | |
| 2016/0155126 A1* | 6/2016 | D'Uva | G06Q 20/40145 705/44 |
| 2019/0259029 A1* | 8/2019 | Chilton | H04L 63/0815 |

* cited by examiner

Primary Examiner — William E Rankins
(74) Attorney, Agent, or Firm — KDB

(57) ABSTRACT

Techniques and apparatus for an interactive element presentation process are described. In one embodiment, for example, an apparatus may include a storage device and logic, at least a portion of the logic implemented in circuitry coupled to the storage device. The logic may operate to maintain a platform database of services selection information based on user selections of a plurality of services, receive an onboarding request from a user device to register a user with a service platform requiring background verification, determine an onboarding request result, and transmit an eligible set of the plurality of service options for presentation on a user device based on a user level of approval and services selection information. Other embodiments are described.

18 Claims, 7 Drawing Sheets

TECHNIQUES FOR ONBOARDING AND VERIFICATION OF USERS TO A SERVICES PLATFORM

TECHNICAL FIELD

Embodiments herein generally relate to managing a network-based services platform and, more particularly, for providing processes for efficient and secure verification and/or onboarding of users to the services platform.

BACKGROUND

Service providers, such as credit card companies and other consumer financial service providers, may interface with customers via network-based platforms, such as internet websites, mobile applications, and/or the like. Initial user registration is an important process that requires secure verification of users to avoid risks associated with fraudulent use of service provider resources. In addition, service providers may engage in customer onboarding, which is the process of introducing customers to new products or services. A goal of service providers is to efficiently and accurately verify new users and onboard existing customers so that they may quickly begin using available services. However, conventional service provider platforms typically employ inefficient and one-size-fits-all registration and onboarding functionalities that do not provide a positive registration and/or onboarding user experience, which may actually deter certain users from using and/or expanding services.

SUMMARY

This Summary is provided to introduce a selection of concepts in a simplified form that is further described below in the Detailed Description. This Summary is not intended to necessarily identify key features or essential features of the claimed subject matter, nor is it intended as an aid in determining the scope of the claimed subject matter.

In accordance with various aspects of the described embodiments is an apparatus that may include a storage device and logic, at least a portion of the logic implemented in circuitry coupled to the storage device. In some embodiment, the logic may operate to maintain a platform database of services selection information based on user selections of a plurality of banking services offered by a financial institution presented via a financial services platform, the services selection information indicating user preferences for an order for accessing the plurality of banking services by users opening new accounts on the financial service platform, receive an onboarding request from a user device to register a user with the financial service platform requiring background verification, the onboarding request associated with request information comprising user profile information and platform relationship information, the platform relationship information indicating whether the user has an existing account with the financial institution, determine an onboarding request result, the onboarding request result comprising one of an approved result or an unapproved result based on the user profile information and the service platform relationship information, wherein the user is designated as a restricted user responsive to the unapproved result or a user level is determined responsive to the approved result, and transmit an eligible set of the plurality of service options for presentation on the user device based on the user level and the services selection information.

In some embodiments of the apparatus, the plurality of banking services comprising one of: checking services, debit card services, direct deposit services, and money transfer services. In various embodiments of the apparatus, the logic to provide at least a portion of the onboarding request information to a financial services exchange operative to determine the onboarding request result. In some embodiments of the apparatus, the logic to receive one of know your customer (KYC) or anti-money laundering (AML) services from a third-party provider via an application programming interface (API) of the financial services exchange.

In various embodiments of the apparatus, the logic to receive approval configuration information from the financial services exchange via the API, the approval configuration information to indicate at least one configuration of the onboarding request information acceptable for the approved result. In exemplary embodiments of the apparatus, the logic to determine services selection information indicating user preferences using a computational model of user selection choices. In some embodiments of the apparatus, the logic to present a restricted subset of the plurality of service options to the user responsive to determining that the user is a restricted user. In various embodiments of the apparatus, the logic to cause the presentation of a new service option for an existing user at a new service presentation time determined based on user preferences of the services selection information.

In accordance with various aspects of the described embodiments is a method that may include receiving an onboarding request from a user device to register a user with a financial service platform requiring background verification, determining request information comprising user profile information and platform relationship information associated with the onboarding request, determining an onboarding request result comprising one of an approved result or an unapproved result based on the user profile information and the service platform relationship information; and responsive to an approved result: determining a user level for the user, and transmitting an eligible set of a plurality of service options for presentation on the user device based on the user level and services selection information, the services selection information based on user selections of a plurality of banking services offered by a financial institution presented via the financial services platform, the services selection information indicating user preferences for an order for accessing the plurality of banking services by users opening new accounts on the financial service platform.

In some embodiments of the method, the plurality of banking services comprising one of: checking services, debit card services, direct deposit services, and money transfer services. In some embodiments of the method, comprising providing at least a portion of the request information to a financial services exchange operative to determine the onboarding request result. In some embodiments of the method, comprising receiving one of know your customer (KYC) or anti-money laundering (AML) services from a third-party provider via an application programming interface (API) of the financial services exchange. In some embodiments of the method, comprising receiving approval configuration information from the financial services exchange via the API, the approval configuration information to indicate at least one configuration of the request information acceptable for the approved result.

In some embodiments of the method, comprising determining services selection information indicating user preferences using a computational model of user selection choices. In some embodiments of the method, comprising presenting a restricted subset of the plurality of service options to the user responsive to determining that the user is a restricted user. In some embodiments of the method, comprising causing the presentation of a new service option for an existing user at a new service presentation time determined based on user preferences of the services selection information.

In accordance with various aspects of the described embodiments is at least one non-transitory computer-readable medium comprising a set of instructions that, in response to being executed via a processing unit of a computing device, cause the computing device to: maintain a platform database of services selection information based on user selections of a plurality of banking services offered by a financial institution presented via a financial services platform, the services selection information indicating user preferences for an order for accessing the plurality of services by users opening new accounts on the financial service platform; receive an onboarding request from a user device to register a user with the financial service platform requiring background verification, the onboarding request associated with request information comprising user profile information and platform relationship information, the platform relationship information indicating whether the user has an existing account with the financial institution; determine an onboarding request result, the onboarding request result comprising one of an approved result or an unapproved result based on the user profile information and the service platform relationship information, wherein the user is designated as a restricted user responsive to the unapproved result or a user level is determined responsive to the approved result; and transmit an eligible set of the plurality of service options for presentation on the user device based on the user level and the services selection information.

In some embodiments of the at least one non-transitory computer-readable medium, the instructions, in response to being executed via the processing unit of the computing device, to cause the computing device to provide at least a portion of the request information to a financial services exchange operative to determine the onboarding request result. In some embodiments of the at least one non-transitory computer-readable medium, the instructions, in response to being executed via the processing unit of the computing device, to cause the computing device to receive one of know your customer (KYC) or anti-money laundering (AML) services from a third-party provider via an application programming interface (API) of the financial services exchange. In some embodiments of the at least one non-transitory computer-readable medium, the instructions, in response to being executed via the processing unit of the computing device, to cause the computing device to receive approval configuration information from the financial services exchange via the API, the approval configuration information to indicate at least one configuration of the request information acceptable for the approved result.

DETAILED DESCRIPTION

Figure 1:
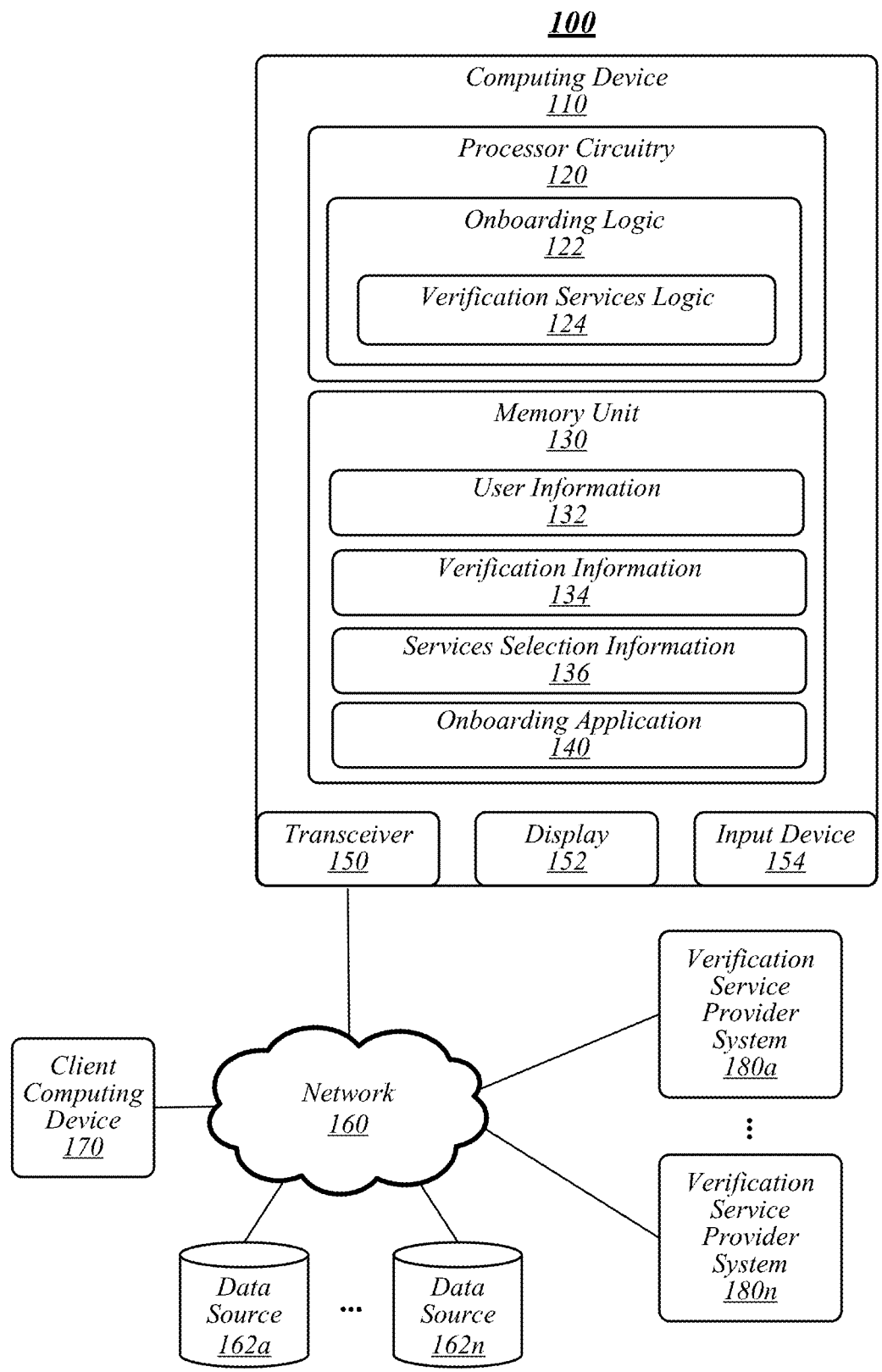
FIG. 1 illustrates an embodiment of a first operating environment according to some embodiments.

Various embodiments may generally be directed toward systems, methods, and/or apparatus for a user verification processes for a network-based interface, such as a services platform. In some embodiments, the services platform may be a website, application interface, and/or the like for users to interact with a service provider, such as a retailer, merchant, financial services provider, job share service, ride share service, credit card company, government entity, and/or the like. User verification processes according to some embodiments may use orchestration layers (OLs) including or in communication with application programming interfaces (APIs) to facilitate a user verification process (for instance, new user registration, onboarding, and/or the like). In general, user verification may include a vetting or proofing process for verifying the identity of its customers, assessing potential risks, meeting industry security standards, and/or meeting mandated requirements. For example, industry standards and/or mandated requirements may include know-your-customer (KYC) processes, anti-money laundering (AML) processes, consumer credit risk, social networking, anti-spamming, e-commerce transactions, and/or the like.

In some embodiments, the services platform may receive user information associated with a user engaging in a user verification process for a transaction. In general, a transaction is any type of interaction with the services platform requiring verification, such as a new registration, access to a new service, purchasing a product, and/or the like. The services platform may determine the user metrics required to get to a decision (for instance, transaction denied, transaction granted, access level, and/or the like) and the appropriate third-party service provider to perform the verification. The services platform may interact with the third-party service provider, for instance, providing KYC and/or AML verification services, via an OL communicating through an API, such as a representational state transfer (RESTful) API.

In various embodiments, the services platform may determine a third-party service provider to perform a verification process based on verification information. For example, certain users and/or verification processes may be better suited for a certain third-party service provider, while other users and/or verification processes may be better suited for a different third-party service provider. For example, one third-party service provider may be optimized for determining credit verification for users with poor credit histories, while another third-party service provider may be more efficient for determining credit verification for users with excellent credit histories. The services platform may operate to analyze user information and/or verification information (for instance, the information required to process the user verification) and determine the best third-party service provider for the verification process.

In exemplary embodiments, the services platform may be configured to differentially verify users. For example, a verification (or onboarding) request may be approved, such as opening an account with a banking service provider. In various embodiments, verification and onboarding may include registering a user with a service provider, for example, requiring background verification and may be used interchangeably. In some embodiments, users may be approved in different levels based on various factors, such as user risk. For example, a first user with a higher credit risk may be approved at level 1 (out of 5, with 5 being the lowest risk level and 1 being the highest risk level), while a second user with a low credit risk may be approved at level 4. When the verification request is completed, the first user and the second user may have access to different service options based on their user level. For example, the second user may have access to more and/or higher-risk options compared with the first user.

Accordingly, some embodiments may provide multiple technological advantages over prior art systems. In addition, various embodiments may provide improvements in computing technology and technological features, for instance, by providing dynamic verification processes for users registering and/or onboarding with a service provider. Such embodiments may improve, inter alia, the efficiency of computing systems managing service platforms and associated user accounts, services, transaction, and/or related articles. One non-limiting example of a technological advantage may include providing an improved user experience for users attempting to perform a transaction or otherwise interact with a services platform by providing a customized and efficient verification process. Another non-limiting example of a technological advantage may include providing a services platform for service providers to utilize third-party verification services orchestrated via OLs and/or APIs. A further non-limiting example of a technological advantage may include providing a services platform where service provides may differentially provide options, transactions, and/or the like to users based on user characteristics. An additional non-limiting example of a technological advantage may include determining optimal third-party service provider for performing a verification process, instead of only using a standard third-party service provider for all verification processes. Other technological advantages are provided by the described embodiments.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include computing device 110 communicatively coupled to (client) computing device 170, for example, via network 160. In some embodiments, computing device 110 and/or computing device 170 may be or may include a stand-alone computing device, such as a personal computer (PC), server, tablet computing device, cloud computing device, mobile computing device (for instance, a smart phone, tablet computing device, and/or the like), data appliance, and/or the like. In some embodiments, computing device 110 may include a plurality of computing devices and/or computing systems (for instance, data centers, cloud computing environments, computing clusters, and/or the like). In various embodiments, computing device 110 may be associated with a service provider for providing services to customers. In some embodiments, service providers may include verification service providers operable to provide certain verification services, such as KYC, AML, credit verification, user identification, and/or the like. In various embodiments, computing device 110 may interact with verification service providers over network 160 via verification service provider systems 180$a$-$n$. In some embodiments, verification service provider systems 180$a$-$n$ may operate to provide various user identification, verification, proofing, or other services. Non-limiting examples of verification service provider systems 180$a$-$n$ may include KYC systems, AML systems, credit reporting/verification systems, government identification systems, and/or the like.

In exemplary embodiments, computing device 170 may be a customer computing device (for instance, smartphones, tablet computing devices, laptops, and/or the like) for accessing services provided via computing device 110.

Although only one computing device 110 and one computing device 170 is depicted in FIG. 1, embodiments are not so limited. In various embodiments, the functions, operations, configurations, data storage functions, applications, logic, and/or the like described with respect to computing device 110 and/or computing device 170 may be performed by and/or stored in one or more other computing devices. A single computing device 110 and a single computing device 170 are depicted for illustrative purposes only to simplify the figure.

As shown in FIG. 1, computing device 110 may include processor circuitry 120, a memory unit 130, a transceiver 150, a display 152 and an input device 154. Processor circuitry 120 may be communicatively coupled to memory unit 130 and/or transceiver 140.

Processor circuitry 120 may include and/or may access various logic for performing processes according to some embodiments. For instance, processor circuitry 120 may include and/or may access onboarding logic 122 and/or verification services logic 124. Processing circuitry 120, onboarding logic 122, verification services logic 124, and/or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although onboarding logic 122 and verification services logic is depicted in FIG. 1 as being within processor circuitry 120, embodiments are not so limited. In addition, although verification services logic 124 is depicted as being a logic of onboarding logic 122, embodiments are not so limited, as verification services logic 124 may be a separate logic. For example, onboarding logic 122, verification services logic 124, and/or any component thereof, may be located within an accelerator, a processor core, an interface, an individual processor die, implemented entirely as a software application (for instance, onboarding application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store user information 132, verification information 134, and/or services selection information 136. In various embodiments, at least a portion of user information 132, verification information 134, and/or services selection information 136 (or other information used or generated according to some embodiments) may be obtained from and/or stored to external data sources 162a-n, for instance, accessed via network 160. Memory unit may store an onboarding application 140 that may operate, alone or in combination with onboarding logic 122, to perform various functions according to some embodiments. For example, onboarding application 140 may be or may include an application operative to implement functionality of onboarding logic 122 and/or verification services logic 124. In various embodiments, onboarding logic 122 may operate to provide various services of a service provider associated with computing device 110 and/or a service platform managed by computing device. Non-limiting examples of service providers may include financial service providers (for instance, banking services, credit card services, financial advice services, brokerage services, and/or the like), entertainment service providers (for instance, Netflix®, Amazon Prime® Video, Comcast®, Verizon®, and/or the like), gaming services, gambling/betting services, music streaming services, cloud computing or hosting service providers (for example, Amazon Web Services®), internet service providers, utility service providers, medical or healthcare service providers, education service providers, vehicle services (for instance, vehicle subscription services), ridesharing services, work sharing services, and/or the like. Embodiments are not limited in this context.

In various embodiments, onboarding logic 122 may operate to provide onboarding services associated with a service provider. For example, for a financial services provider, onboarding logic 122, alone or via verification logic 124, may be operative to maintain a platform database of services selection information based on user selections of services offered by the financial services provider, process onboarding requests, perform background verifications, facilitate onboarding verification via third-party service providers, and/or the like.

In some embodiments, onboarding logic 122 may operate to determine, generate, maintain, or otherwise process services selection information 136. In some embodiments, services selection information 136 may include information associated with user selections of services, including preferences for services, order of services (for instance, users are interested in service A first, service A second, etc.), timing of services (for instance, users are interested in service A after time period A, service B after event B (for example, a money market account after achieving a certain balance amount), and/or the like). For example, in exemplary embodiments, onboarding logic 122 may maintain services selection information 136 as a platform database of services selection information based on user selections of a plurality of services offered by service presented via a service provider platform. In some embodiments, the services selection information may indicate user preferences for an order for accessing services by users of the service provider platform.

In various embodiments, process services selection information 136 may include a computational model operative to analyze user information to determine onboarding services to present to a user. For example, onboarding logic 122 may analyze user information 132 of a user registering/registered to determine a set of services to present or recommend to a user. In some embodiments, the computational models may be or may include artificial intelligence (AI) and/or machine learning (ML) processes. Non-limiting examples of computational models may include an ML model, an AI model, a neural network (NN), an artificial neural network (ANN), a convolutional neural network (CNN), a deep learning (DL) network, a deep neural network (DNN), a recurrent neural network (RNNs), combinations thereof, variations thereof, and/or the like. Embodiments are not limited in this context.

In various embodiments, onboarding logic 122 may receive, determine, or otherwise access user information 132. For example, a user may register with a platform of a service provider and may provide personal information, such as name and address information, a social security number, employment information, education information, financial information, and/or the like. For instance, onboarding logic 122 may receive an onboarding request from a user device to register a user with a service provider platform requiring background verification. The onboarding request may include request information such as user profile information and platform relationship information indicating whether the user has an existing account with the financial institution (for instance, a user may have a first credit card with a financial service provider and may be requesting to open a savings account, loan, second credit card, and/or the like).

In various embodiments, onboarding logic 122 may operate to determine an onboarding request result. In some embodiments, the onboarding request result may include one of an approved result or an unapproved result based on the user profile information and the service platform relationship information (for instance, opening a second account may increase the risk associated with the user, longevity of relationship may decrease the risk associated with the user, and/or the like). In exemplary embodiments, a user may be designated as a restricted user responsive to an unapproved result or a user level may be determined responsive to the approved result.

In some embodiments, onboarding logic 122 may perform a verification (or onboarding) process, for instance, via verification logic 124. In some embodiments, the verification process may operate to determine a user eligibility to for services provided via a service provider, such as banking services, credit card services, and/or the like. For example, the verification process may include identify proofing, KYC, AML, eligibility standards analysis, and/or the like. Onboarding logic 122 may include or access APIs to third-party verification service provider systems 180a-n to perform aspects of the verification process. For instance, verification service provider system 180a may perform credit checks and verification service provide system 180n may perform KYC analyses. In some embodiments, the APIs provide a web-based process (for instance, forms, portals, and/or the like) via an online or mobile application providing a process or flow that allows a user to provider user information 132 to verification service provider systems 180a-n implemented using the service provider platform (for instance, a user may not be aware that they are submitting information to a third-party provider). In various embodiments, multiple APIs may be employed and calls between the two or more APIs may be orchestrated.

In some embodiments, multiple third-party services may be available to provide verification services. For example, verification service provider systems 180a-n may include a plurality of KYC service providers. Onboarding logic 122 may operate to determine an optimal or "best" verification service provider systems 180a-n based on user information 132, verification information 134, and/or the like. In some embodiments, verification information 134 may include information associated with the verification process, such as user information 132 submitted via an onboarding request, information a service provider requires for verification, and/or the like. For instance, certain of verification service provider systems 180a-n may be better suited for certain situations. For example, a first KYC service provider may be optimal for a certain user demographic, credit rating, service/product, public users, business users, and/or the like. In various embodiments, onboarding logic 122 may analyze user information 132 and/or onboarding requests to determine an optimal verification service provider systems 180a-n, API, and/or the like to process the request. In exemplary embodiments, onboarding logic 122 may use a computational model with user information and/or the onboarding request as input and one or more optimal verification service provider systems 180a-n as output.

Figure 2:
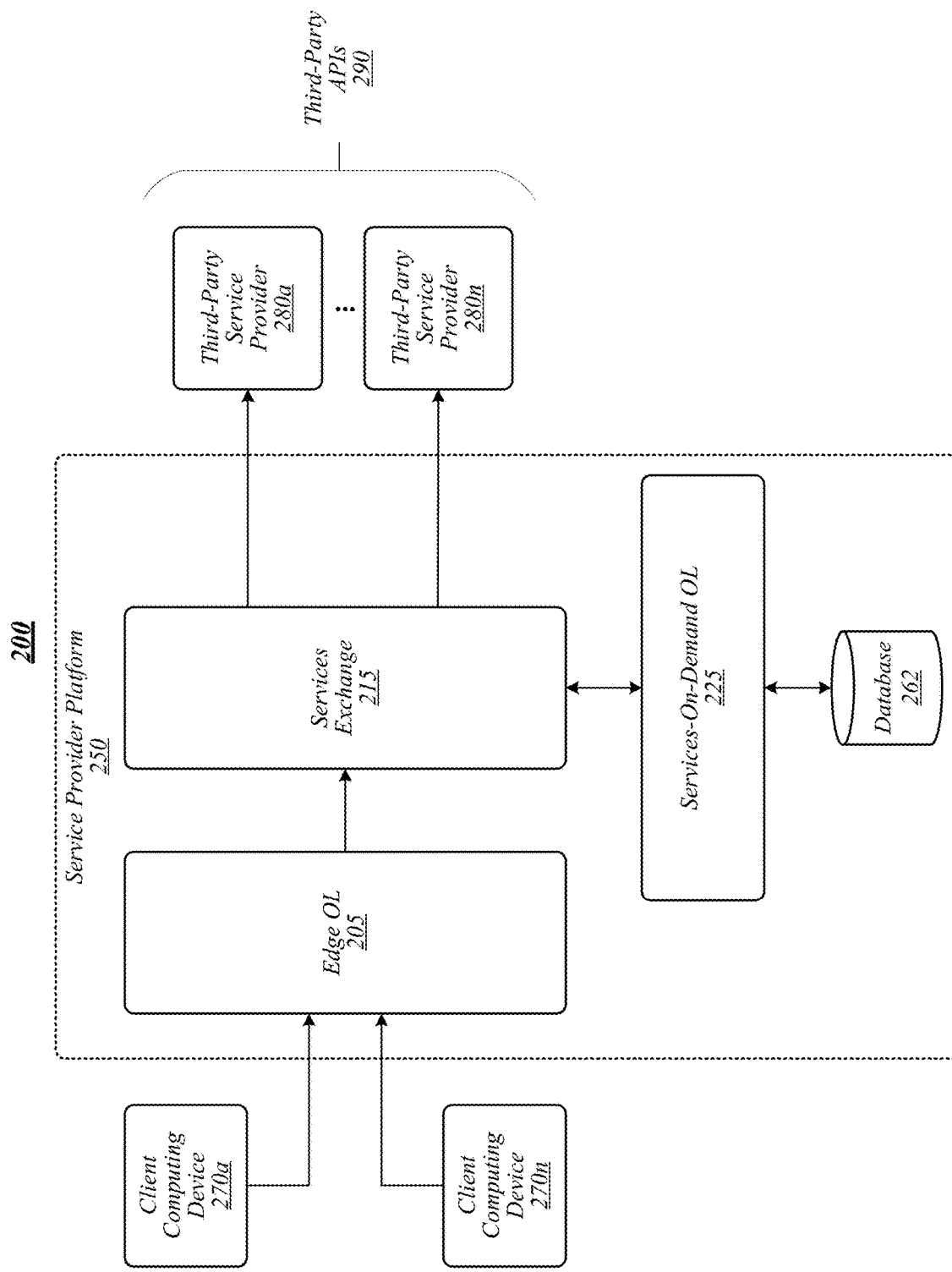
FIG. 2 illustrates an embodiment of a second operating environment according to some embodiments.

FIG. 2 illustrates an example of an operating environment 200 that may be representative of some embodiments. As shown in FIG. 2, client computing devices 270a-n used by service provider customers may interface with a service provider platform 250 via an edge orchestration layer (OL) 205. In some embodiments, service provider platform 250 may be or may include a web application and/or a mobile application (or mobile app). Edge OL 205 may be embodied as software, hardware or as a software/hardware combination within one or more computing devices (for example, computing device 110) maintained, for example, at a service provider data center or information technology (IT) center. In general, an orchestration layer may be designed for integrating two or more applications and/or services together to automate a process, synchronize data in real-time, and/or perform a process according to some embodiments. An OL, for example, may be provided as a service or microservice that may be scaled and deployed independently, for example, cooperating with one or more APIs, accessing one or more databases 262, and/or interacting with various services, such as a services exchange 215.

In some embodiments, edge OL 205 may operate as a gateway service. For example, edge OL 205 may be or may include a Zuul API gateway, Eureka gateway, and/or other edge services. For example, edge OL 205 may receive requests (such as onboarding requests) from client devices 270a-n and delegate the requests, for example, to services exchange 215.

Services exchange 215 may operate as a service provider gateway, for example, to third-party service providers 280a-n via third-party APIs 290. Third-party APIs may be used to facilitate user verification and/or to provide services according to some embodiments. In various embodiments, services exchange 215 may interact with a services-on-demand (SOD) OL 225 operative to provide services on demand. For example, for a financial services provider, SOD may be or may include a banking-on-demand (BOD) OL 225. Services exchange 215 may interact with SOD OL 225 via a developer exchange (or DevExchange). In some embodiments, the DevExchange may be or may include a platform operative to integrate the on-demand services, such as providing access to a user application, to client devices 270a-n. For instance, DevExchange may facilitate encryption, API access, and/or the like. In various embodiments, SOD OL 225 may access a database, such as an Amazon® Aurora relational database service.

Figure 3:
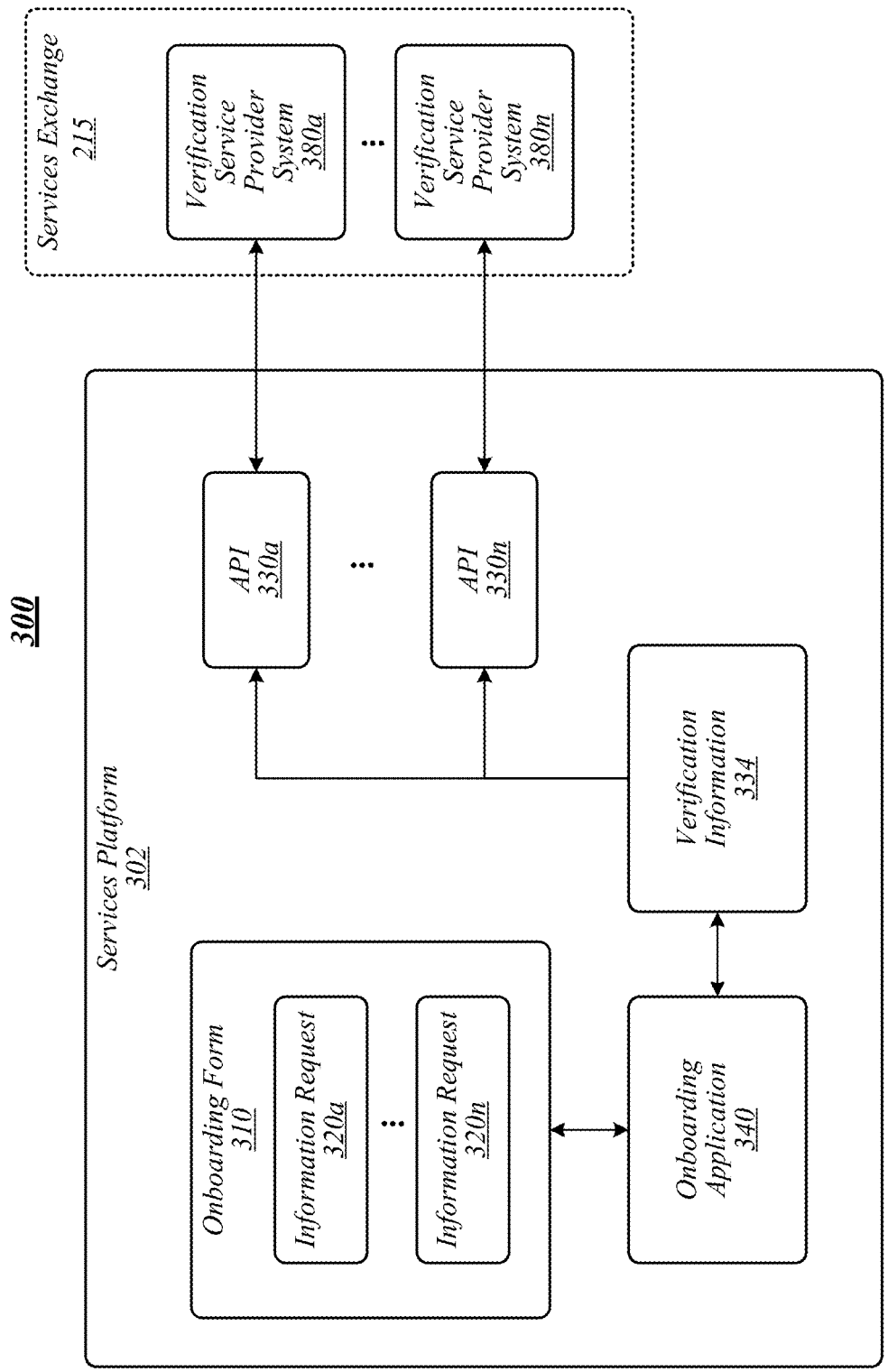
FIG. 3 illustrates an embodiment of a third operating environment according to some embodiments.

FIG. 3 illustrates an example of an operating environment 300 that may be representative of some embodiments. As shown in FIG. 3, a services platform 302 may present an onboarding form 310 to a user. Onboarding form 310 may be generated responsive to a user requesting a service, applying for a service, initiated by a service provider (for instance, prompting a user to sign up for a service), registering with services platform, and/or the like. Onboarding form 310 may include various information requests 320a-n. In general, information requests 320a-n may be or may include requests for information required to process the onboarding. For example, for a credit card onboarding process, information requests 320a-n may include requests for name and address information, employment information, salary information, social security number, and/or the like.

Onboarding form 310 may generate an onboarding application 340 (or onboarding request) that may include user information from information requests 320a-n as well as user profile and/or platform history information, for example, if the user has a relationship with the service provider. Verification information 334 may be determined from onboarding application 340, such as address information, social security number, and/or the like. APIs 330a-n may be used to access services provided by verification service provider systems 380a-n. For example, API 330a may be used by services platform 302 to perform a KYC service via verification service provider system 380a.

For example, the onboarding application 340 may include an onboarding request associated with request information that may include user profile information and platform relationship information. In some embodiments, the platform relationship information may indicate whether the user has a relationship with the services platform 302 and the nature of such a relationship. For example, the platform relationship information may indicate whether the user has an existing account, age of the existing account, user activity, registered services, and/or the like.

In some embodiments, services platform 302 may provide the request information to a services exchange 215 (such as a financial services exchange for a financial services provider) operative to determine a onboarding request result, for example, based on information provided by verification service provider systems 380a-n. For example, services platform 302 may receive information from verification service provider systems 380a-n that a user is a medium credit risk and services platform may generate an onboarding request result based on this information as well as other user information (for instance, account balances, employment information, fraudulent activity, user history, and/or the like).

Figure 4:
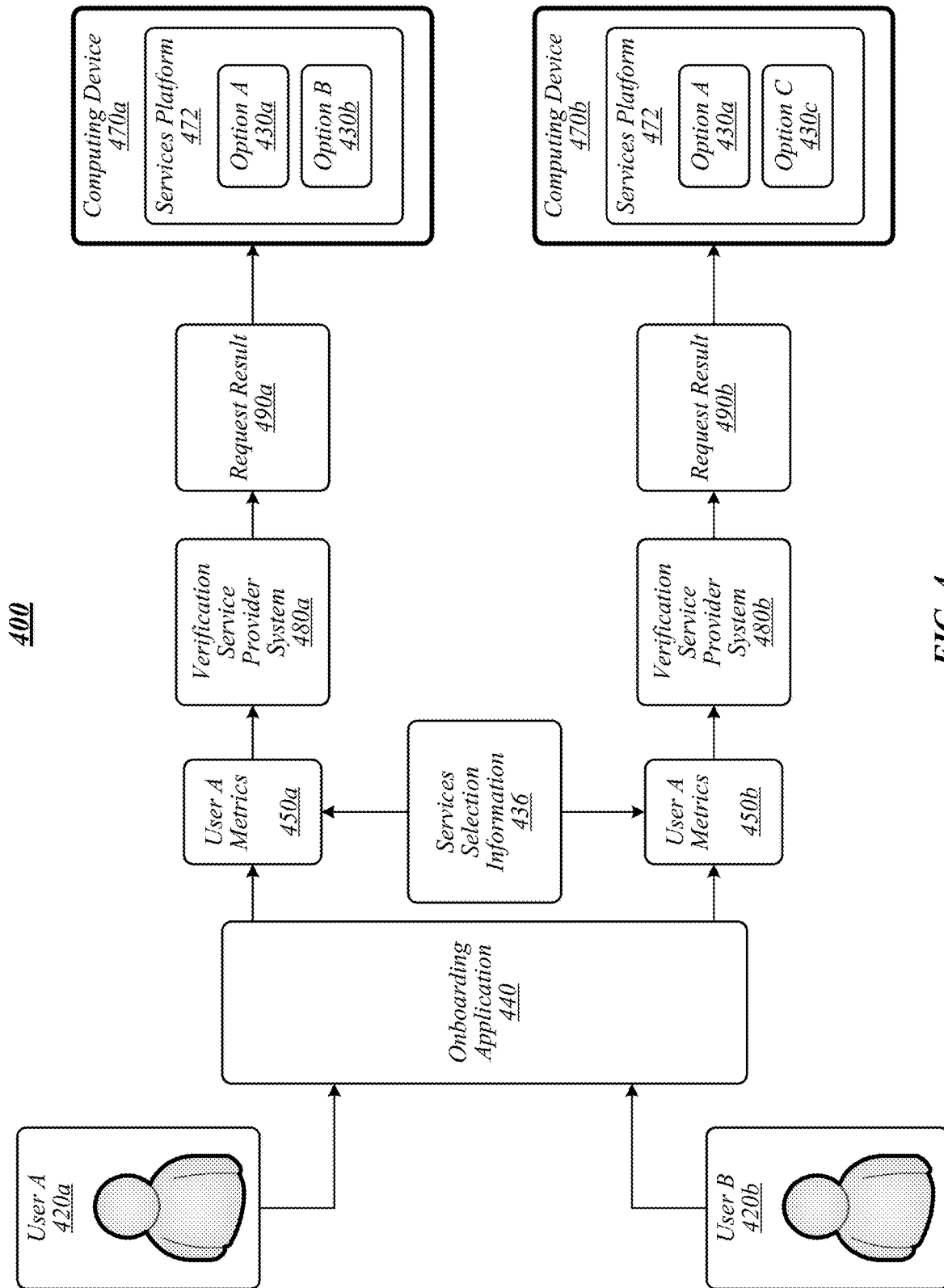
FIG. 4 illustrates an embodiment of a fourth operating environment according to some embodiments.

In some embodiments, services exchange 215 may be a central onboarding services system operative to provide verification services. For example, services platform 302 may be performing a verification service for service A (for instance, a credit card application). Services exchange 215 may provide the type and form of information required to get to a decision on the verification service. In some embodiments, services exchange 215 may provide the minimum information required to get the quickest decision that is easiest for the user. For example, services exchange 215 may determine that verification service provider system 380a is the optimal service for the verification process (or a portion thereof) and may provide the minimal amount of required information. In various embodiments, the minimal amount of information may be included as the required information on onboarding form 310 information requests 320a-n. For example, services platform 302 may receive approval configuration information from the financial services exchange via the API, the approval configuration information to indicate at least one configuration of the onboarding request information acceptable for an approved result FIG. 4 illustrates an example of an operating environment 400 that may be representative of some embodiments. As shown in FIG. 4, User A 420a and User B 420b may start an onboarding application (or onboarding request) 440. For example, onboarding application 440 may be to open a credit card account with a service provider. User metrics 450a, 450b for each of User A 420a and User B 420b may be determined from information provided via onboarding application 440 and/or services selection information 436. User metrics 450a, 450b may be or may include user information used for determining a verification process and/or selecting service platform options. For example, user metrics 450a, 450b may include user demographic information, credit information, and/or the like that are personal to the user. In another example, user metrics 450a, 450b may be or may include profile information used to profile a user for preferred services based on services selection information 436. In some embodiments, user metrics 450a, 450b may be or may include user profile information and the service platform relationship information. For example, user metrics 450a may indicate that for a user with a profile of User A 420a, other similar users are interested in services A, B, and C, while user metrics 450b may indicate that for a user with a profile of User B 420b, other similar users are interested in services A, D, and E, In some embodiments, user metrics 450a, 450b for each of User A 420a and User B 420b may be provided to a verification service provider system 480a, 480b. In some embodiments, verification service provider systems 480a, 480b may be the same service provider system (for instance, a single KYC service provider). In other embodiments, verification service provider systems 480a, 480b may be different. Verification service provider systems 480a, 480b may generate a request result 490a, 490b for each of User A 420a and User B 420b.

In some embodiments, request results 490a, 490b may include one of an approved result or an unapproved result based on the user metrics 450a, 450b, such as user profile information and the service platform relationship information. In some embodiments, user may be designated as a restricted user responsive to an unapproved result. For example, a user that does not meet credit standards for a service may receive an unapproved result and may be denied access to the service. In various embodiments, a user level may be determined responsive to the approved result. The user level may be determined based on user metrics 450a, 450b. For example, User A 420a may be approved for a credit card at user level 1 (out of a scale of 1 to 5, with 1 being the lowest level and 5 being the highest level) and User B may be approved for a credit card at user level 5. Accordingly, User A 420a may receive a credit card with a lower credit limit and higher interest rate compared with the credit card offered to User B.

An eligible set of the plurality of service options 430a-c may be presented on user devices 470a, 470b via services platform 472 based on the user level and the services selection information. For example, User A 420a may be presented with Option A 430a and Option B, while User B 420b may be presented with Option A 430a and Option B 430c.

Figure 5:
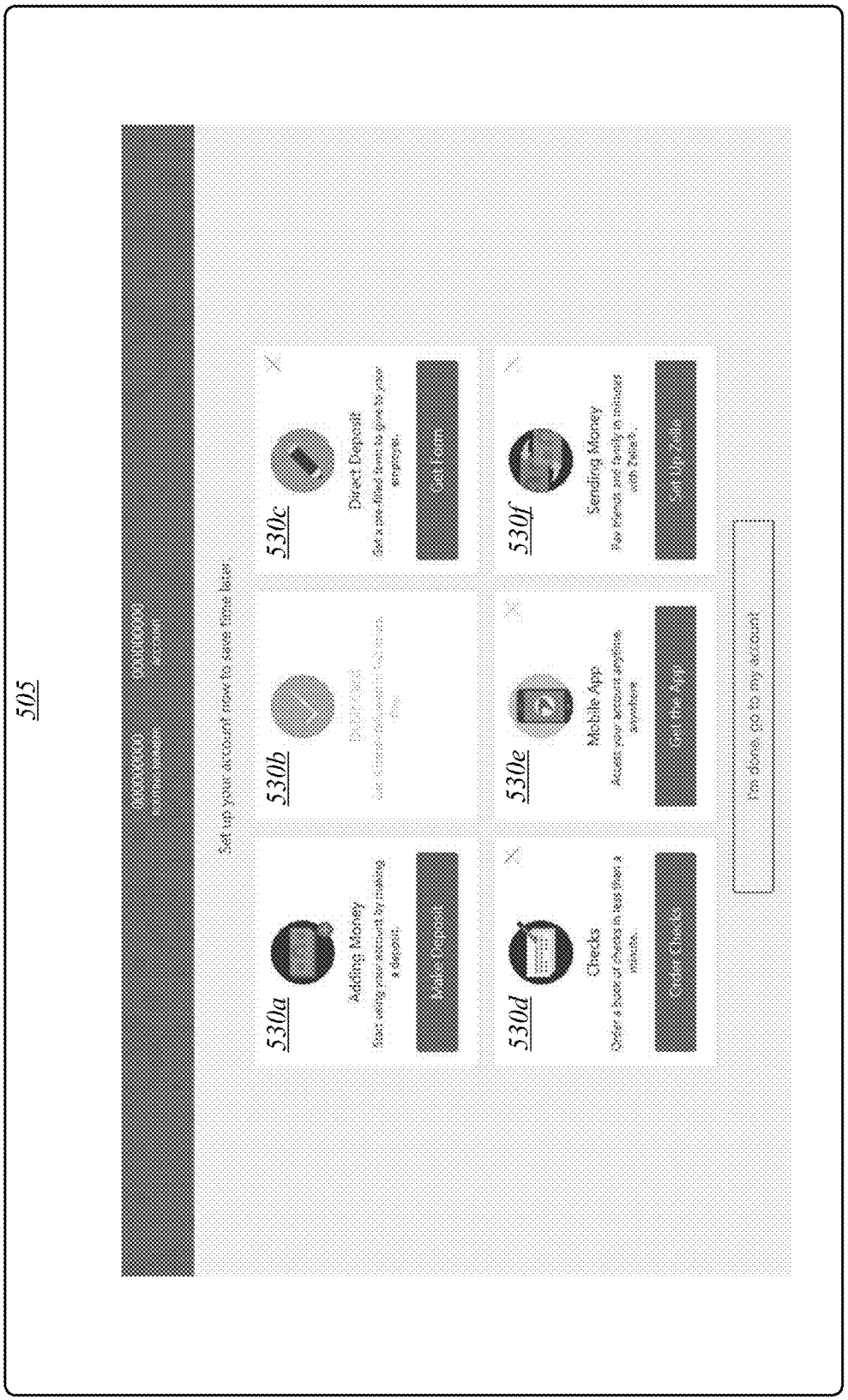
FIG. 5 illustrates an embodiment of a services platform interface according to some embodiments.

FIG. 5 illustrates an embodiment of a services platform interface according to some embodiments. As shown in FIG. 5, a services platform 505 may present service options 530a-f to a user responsive to a request result, such as opening an account with the services platform 505. For example, based on user metrics associated with the user, an adding money option 530, a direct deposit option 530c, a checks option 530d, a mobile app option 530e, and a sending money option 530f were presented to the user. A debit card hand-delivery option 530b was not available to the user, for example, due to the user's location, relationship information, and/or the like.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
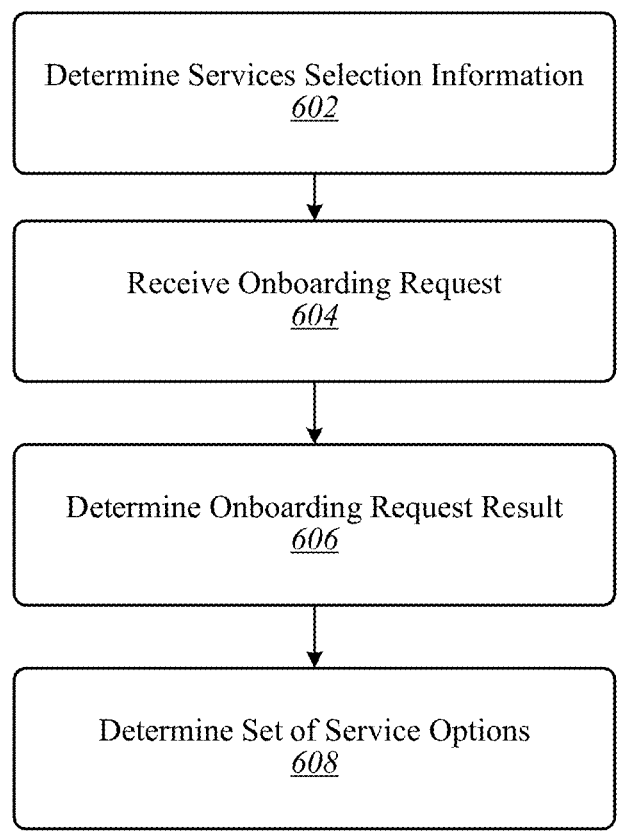
FIG. 6 illustrates an embodiment of a logic flow according to some embodiments.

FIG. 6 illustrates an embodiment of a logic flow 600. Logic flow 600 may be representative of some or all of the operations executed by one or more embodiments described herein, such as computing device 110. Logic flow 600 may be representative of some or all of the operations of a process for a verification (or onboarding) process according to some embodiments.

At block 602, logic flow 600 may determine services selection information. For example, onboarding logic 122 may determine or access services selection information for a plurality of users associated with a services platform. The services selection information may include historical services selection information for particular users and/or a population of users, for instance, with similar user profiles. The services selection information may be stored in a database or other data storage structure. In various embodiments, services selection information may include a computational model that may take in user information as input and generate services preferences or options as output. Embodiments are not limited in this context.

In an example for a financial services provider, logic flow 600 may operate to maintain a platform database of services selection information based on user selections of a plurality of banking services offered by a financial institution presented via a financial services platform. In some embodiments, the services selection information may indicate user preferences for an order for accessing the plurality of banking services by users opening new accounts on the financial service platform.

Logic flow 600 may receive an onboarding requests at block 604. For example, a user may fill out information requests 320a-n on an onboarding request form 310. The information may be packaged as an onboarding request, for example, based on the configuration of information required for verification. For instance, logic flow 600 may receive an onboarding request from a user device to register a user with the financial service platform that requires background verification. The onboarding request may be associated with request information comprising user profile information and platform relationship information. The platform relationship information may indicate whether the user has an existing account with the financial institution.

At block 606, logic flow 606 may determine an onboarding request result. For example, an onboarding request result may be generated based on one or more results from third-party service providers interfaced via OLs and/or APIs. For example, the onboarding requests result may be generated based on one or more of a credit score service provider, a KYC service provider, an AML service provider, and/or the like. In some embodiments, the onboarding request result may be based on a combination of the results from the third-party service providers.

In an example, logic flow 600 may determine an onboarding request result that includes one of an approved result or an unapproved result based on the user profile information and the service platform relationship information. In some embodiments, the user may be designated as a restricted user responsive to the unapproved result or a user level may be determined responsive to the approved result At block 608, logic flow 600 may determine a set of service options. For example, logic flow 600 may transmit an eligible set of the plurality of service options for presentation on the user device based on the user level and the services selection information. In another example, an eligible set of the plurality of service options 430a-c may be presented on user devices 470a, 470b via services platform 472 based on the user level and the services selection information. For example, User A 420a may be presented with Option A 430a and Option B, while User B 420b may be presented with Option A 430a and Option B 430c.

Figure 7:
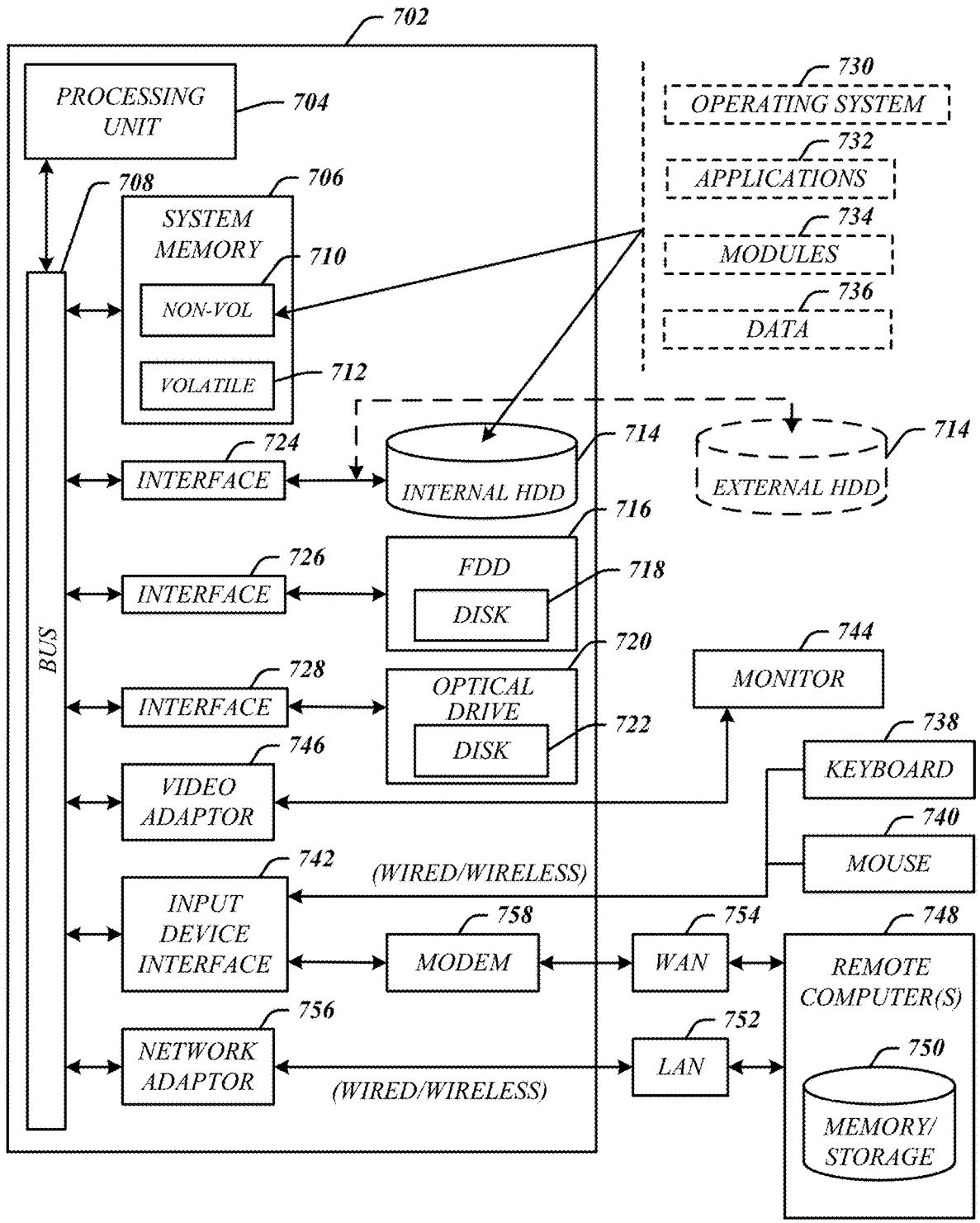
FIG. 7 illustrates an embodiment of a computing architecture according to some embodiments.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of computing devices 110 and/or 310. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of computing device 110.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
at least one processor; and
a storage device coupled to the at least one processor, the storage device storing instructions that, when executed by the at least one processor, cause the at least one processor to:
access a machine learning model trained to:
receive user profile information of a user as input, and
determine at least one verification service provider as output, the at least one service provider determined to be optimized for background verification of the user based on the user profile information, the user profile information comprising a credit rating and the at least one service provider optimized for the credit rating of the user,
maintain a platform database of services selection information based on user selections of a plurality of banking services offered by a financial institution presented via a financial services platform, the services selection information indicating user preferences for an order for accessing the plurality of banking services by users opening new accounts on a financial service platform,
receive at least one onboarding request from at least one user device to register at least one user with the financial service platform requiring background verification, the at least one onboarding request associated with onboarding request information comprising user profile information and platform relationship information, the platform relationship information indicating whether the at least one user has an existing account with the financial institution,
determine at least one verification service provider via the machine learning model based on the user profile information in the at least one onboarding request, the at least one verification service provider optimized to verify the at least one user based on the credit rating of the user,
provide the at least one onboarding request to an edge orchestration layer operative to delegate the at least one onboarding request to a services exchange, the services exchange configured to determine an application programming interface (API) for communicating with the at least one verification service provider to facilitate determining a portion of an onboarding request result,
determine the onboarding request result, the onboarding request result comprising one of an approved result or an unapproved result based on the user profile information and the service platform relationship information, wherein the user is designated as a restricted user responsive to the unapproved result or a user level is determined responsive to the approved result, and
transmit an eligible set of a plurality of service options for presentation on the user device based on the user level and the services selection information.

2. The apparatus of claim 1, the instructions, when executed by the at least one processor, to cause the at least one processor to provide at least a portion of the onboarding request information to a financial services exchange operative to determine the onboarding request result.

3. The apparatus of claim 2, the instructions, when executed by the at least one processor, to cause the at least one processor to receive one of know your customer (KYC) or anti-money laundering (AML) services from a third-party provider via the API.

4. The apparatus of claim 3, the instructions, when executed by the at least one processor, to cause the at least one processor to receive approval configuration information from the financial services exchange via the API, the approval configuration information to indicate at least one configuration of the onboarding request information acceptable for the approved result.

5. The apparatus of claim 1, the instructions, when executed by the at least one processor, to cause the at least one processor to present a restricted subset of the plurality of service options to the at least one user responsive to determining that the user is a restricted user.

6. The apparatus of claim 1, the instructions, when executed by the at least one processor, to cause the at least one processor to cause the presentation of a new service option for an existing user at a new service presentation time determined based on user preferences of the services selection information.

7. The apparatus of claim 1, the at least one user comprising a first user and a second user, the first user having a first credit rating of a poor credit history and the second user having a second credit rating of an excellent credit history, wherein the at least one verification service provider comprises a first verification service provider, optimized for verifying individuals with poor credit histories, determined for the first user and a second verification service provider, optimized for verifying individuals with excellent credit histories, determined for the second user.

8. A computer-implemented method, comprising, via at least one processor of at least one computing device:
    receiving at least one onboarding request from at least one user device to register at least one user with the financial service platform requiring background verification;
    accessing a machine learning model trained to:
        receive user profile information of a user as input, and
        determine at least one verification service provider as output, the at least one service provider determined to be optimized for background verification of the user based on the user profile information, the user profile information comprising a credit rating and the at least one service provider optimized for the credit rating of the user;
    determining request information comprising user profile information and service platform relationship information associated with the at least one onboarding request;
    determining at least one verification service provider via the machine learning model based on the user profile information in the at least one onboarding request, the at least one verification service provider optimized to verify the at least one user based on the credit rating of the user;
    providing the at least one onboarding request to an edge orchestration layer operative to delegate the at least one onboarding request to a services exchange, the services exchange configured to determine an application programming interface (API) for communicating with the at least one verification service provider to facilitate determining a portion of an onboarding request result;
    determining the onboarding request result comprising one of an approved result or an unapproved result based on the user profile information and the service platform relationship information; and
    responsive to an approved result:
        determining a user level for the user, and
        transmitting an eligible set of a plurality of service options for presentation on the user device based on the user level and services selection information, the services selection information based on user selections of a plurality of banking services offered by a financial institution presented via the financial services platform, the services selection information indicating user preferences for an order for accessing the plurality of banking services by users opening new accounts on the financial service platform.

9. The method of claim 8, comprising providing at least a portion of the request information to a financial services exchange operative to determine the onboarding request result.

10. The method of claim 9, comprising receiving one of know your customer (KYC) or anti-money laundering (AML) services from a third-party provider via the API.

11. The method of claim 10, comprising receiving approval configuration information from the financial services exchange via the API, the approval configuration information to indicate at least one configuration of the request information acceptable for the approved result.

12. The method of claim 8, comprising presenting a restricted subset of the plurality of service options to the user responsive to determining that the user is a restricted user.

13. The method of claim 8, comprising causing the presentation of a new service option for an existing user at a new service presentation time determined based on user preferences of the services selection information.

14. The method of claim 8, the at least one user comprising a first user and a second user, the first user having a first credit rating of a poor credit history and the second user having a second credit rating of an excellent credit history, wherein the at least one verification service provider comprises a first verification service provider, optimized for verifying individuals with poor credit histories, determined for the first user and a second verification service provider, optimized for verifying individuals with excellent credit histories, determined for the second user.

15. At least one non-transitory computer-readable medium comprising a set of instructions that, in response to being executed via a processing unit of a computing device, cause the computing device to:
    access a machine learning model trained to:
        receive user profile information of a user as input and
        determine at least one verification service provider as output, the at least one service provider determined to be optimized for background verification of the user based on the user profile information, the user profile information comprising a credit rating and the at least one service provider optimized for the credit rating of the user;
    maintain a platform database of services selection information based on user selections of a plurality of banking services offered by a financial institution presented via a financial services platform, the services selection information indicating user preferences for an order for accessing the plurality of banking services by users opening new accounts on a financial service platform;
    receive at least one onboarding request from at least one user device to register at least one user with the financial service platform requiring background verification, the at least one onboarding request associated with onboarding request information comprising user profile information and platform relationship information, the platform relationship information indicating whether the at least one user has an existing account with the financial institution;
    determine at least one verification service provider via the machine learning model based on the user profile information in the at least one onboarding request, the at least one verification service provider optimized to verify the at least one user based on the credit rating of the user;
    provide the at least one onboarding request to an edge orchestration layer operative to delegate the at least one onboarding request to a services exchange, the services exchange configured to determine an application programming interface (API) for communicating with the at least one verification service provider to facilitate determining a portion of an onboarding request result;

determine the onboarding request result, the onboarding request result comprising one of an approved result or an unapproved result based on the user profile information and the service platform relationship information, wherein the user is designated as a restricted user responsive to the unapproved result or a user level is determined responsive to the approved result; and transmit an eligible set of a plurality of service options for presentation on the user device based on the user level and the services selection information.

16. The at least one non-transitory computer-readable medium of claim 15, the instructions, in response to being executed via the processing unit of the computing device, to cause the computing device to receive one of know your customer (KYC) or anti-money laundering (AML) services from a third-party provider via the API.

17. The at least one non-transitory computer-readable medium of claim 15, the instructions, in response to being executed via the processing unit of the computing device, to cause the computing device to receive approval configuration information from the financial services exchange via the API, the approval configuration information to indicate at least one configuration of the request information acceptable for the approved result.

18. The at least one non-transitory computer-readable medium of claim 15, the at least one user comprising a first user and a second user, the first user having a first credit rating of a poor credit history and the second user having a second credit rating of an excellent credit history, wherein the at least one verification service provider comprises a first verification service provider, optimized for verifying individuals with poor credit histories, determined for the first user and a second verification service provider, optimized for verifying individuals with excellent credit histories, determined for the second user.

* * * * *